United States Patent [19]

Pollack, Jr.

[11] Patent Number: 4,553,201
[45] Date of Patent: Nov. 12, 1985

[54] DECOUPLING APPARATUS FOR VERIFICATION OF A PROCESSOR INDEPENDENT FROM AN ASSOCIATED DATA PROCESSING SYSTEM

[75] Inventor: Frank S. Pollack, Jr., Phoenix, Ariz.

[73] Assignee: Honeywell Information Systems Inc., Phoenix, Ariz.

[21] Appl. No.: 479,790

[22] Filed: Mar. 28, 1983

[51] Int. Cl.[4] .......................... G06F 11/22; G06F 9/22
[52] U.S. Cl. ...................................... 364/200; 371/16; 371/17
[58] Field of Search ........................ 371/14, 16, 25, 17; 364/200 MS File, 900 MS File

[56] References Cited

U.S. PATENT DOCUMENTS

| | | | |
|---|---|---|---|
| 4,048,481 | 9/1977 | Bailey | 364/200 |
| 4,167,779 | 9/1979 | Sullivan et al. | 364/200 |
| 4,371,952 | 2/1983 | Schuck | 364/900 |
| 4,482,953 | 11/1984 | Burke | 371/25 |

*Primary Examiner*—James D. Thomas
*Assistant Examiner*—David Y. Eng

*Attorney, Agent, or Firm*—A. A. Sapelli; L. J. Marhoefer; J. S. Solakian

[57] ABSTRACT

In a data processing system having a plurality of CPUs, each CPU is operatively connected to other portions of the data processing system through a system interface unit. The CPU includes a cache memory, an execution unit, and a control unit. Further, each CPU includes an apparatus for verifying the operability of the CPU independent from the operation of the data processing system, which comprises a switch element, interposed between a first port of the CPU and the system interface unit, for decoupling the CPU from said system interface unit in response to a decoupling control signal. A detecting element, detects whether the CPU and the system interface unit are operatively connected to generate a configuration signal indicating the status of the operative connection. A maintenance panel is connected to the switch element and to the detecting element via a second CPU port. The maintenance panel includes logic to control the decoupling of the CPU from the system interface unit, control logic to cause the CPU to execute test sequences, and analyzing logic to check the results of the test sequences to verify whether the CPU is functioning correctly.

4 Claims, 3 Drawing Figures

DECOUPLING APPARATUS FOR VERIFICATION OF A PROCESSOR INDEPENDENT FROM AN ASSOCIATED DATA PROCESSING SYSTEM

BACKGROUND OF THE INVENTION

1. Field of the Invention

This invention relates generally to data processing systems and more particularly to the testing of data processing systems, especially those having multiple central processing units.

2. Description of the Related Art

It is known in the related art to test the integrity of a central processing unit of a data processing system by introducing appropriate software sequences of instructions and programs into the main memory. Subsequently, the programs are entered into the central processing unit, the programs are executed, and the results of the program execution are compared to expected results to verify the operation of the data processing system. This procedure has the disadvantage that results of the program execution stored in main memory consists of data that has potentially been compromised. In the configuration where more than one central processing unit has access to the main memory, erroneous information can be transferred to the central processing units not under test. It would therefore be desirable to provide a method of utilizing sequences of instructions and programs to test a central processing unit when the central processing unit is isolated from the remainder of the data processing unit. However, central processing units are typically arranged to accept information only through an interface port.

It is also known in the prior art to provide a maintenance panel with conductive paths coupled to selected locations of the central processing unit. From the maintenance panel, pre-selected registers can have predetermined data sequences entered therein. The maintenance panel can then cause the central processing unit to perform operations corresponding to the predetermined data sequences, e.g., by initiating a predetermined number of system clock cycles. The accuracy of the central processing unit operations can be determined by extracting data sequences from the selected central processing unit locations by means of the maintenance panel and comparing these sequences with expected data sequences in the appropriate registers. This verification technique has several disadvantages. One disadvantage is that the process of loading preselected registers can be relatively slow. Furthermore, this procedure is artificial and does not exemplify the typical operation of a central processing unit. A further disadvantage is that aditional manipulation of data resulting from transfer to and from the maintenance panel can introduce ambiguities that may obscure the origin of the errors.

SUMMARY OF THE INVENTION

It is therefore an object of the invention to provide an improved data processing system for verification of central processing unit operation.

It is a further object of the present invention to provide an improved diagnostic procedure for data processing systems.

It is a more particular object of the present invention to provide apparatus for loading diagnostic programs directly into the cache memory of a central processing unit so that the system memory can be used to support the operation of other central processing units in the data processing system independent of the central processing unit being tested.

The aforementioned and other objects of the present invention are accomoplished by providing apparatus for storing a plurality of diagnostic programs external to the central processing system. Upon detection of an error by one of the central processing units, the central processing unit is electronically decoupled from the remainder of the data processing system and the diagnostic programs are loaded directly into the cache memory associated with the central processing unit having the identified error. Because the normal transfer of data into the cache is not occurring, error detection apparatus, which normally renders such transfers ineffective, must be inactivated so that non-main memory data can be entered into cache memory. The central processing unit executes the diagnostic programs in the cache memory and stores the results in the cache memory. The cache memory is then interrogated by the external apparatus and the results of the diagnostic program are analyzed to determine if the central processing unit is functioning correctly. If an error is detected, the location of the error can be diagnosed and appropriate activity such as reconfiguration or repair can be initiated.

These and other features of the present invention will be understood upon reading of the following description along with the drawings.

DESCRIPTION OF THE PREFERRED EMBODIMENT

Detailed Description of the Figures

Figure 1:
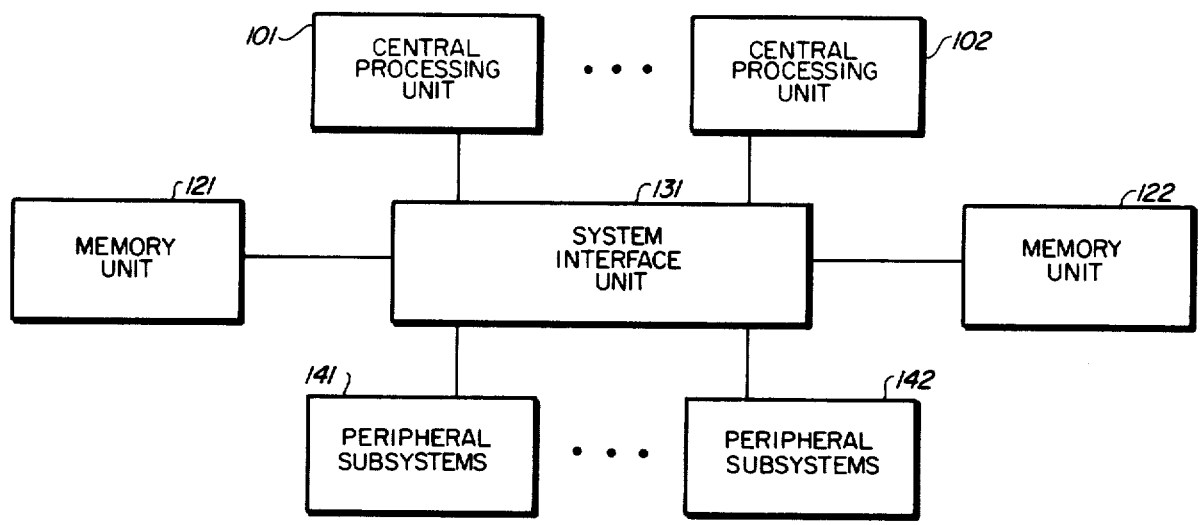
FIG. 1 is a general block diagram of a data processing system having multiple central processing units.

Referring now to FIG. 1, a general diagram of a data processing system is shown. A plurality of central processing units 101 through 102 can be coupled to the system interface unit 131. The system interface unit 131 can be also coupled to memory units 121 through 122. Finally, the system interface unit can be coupled to a plurality of peripheral subsystems 141 through 142.

Figure 2:
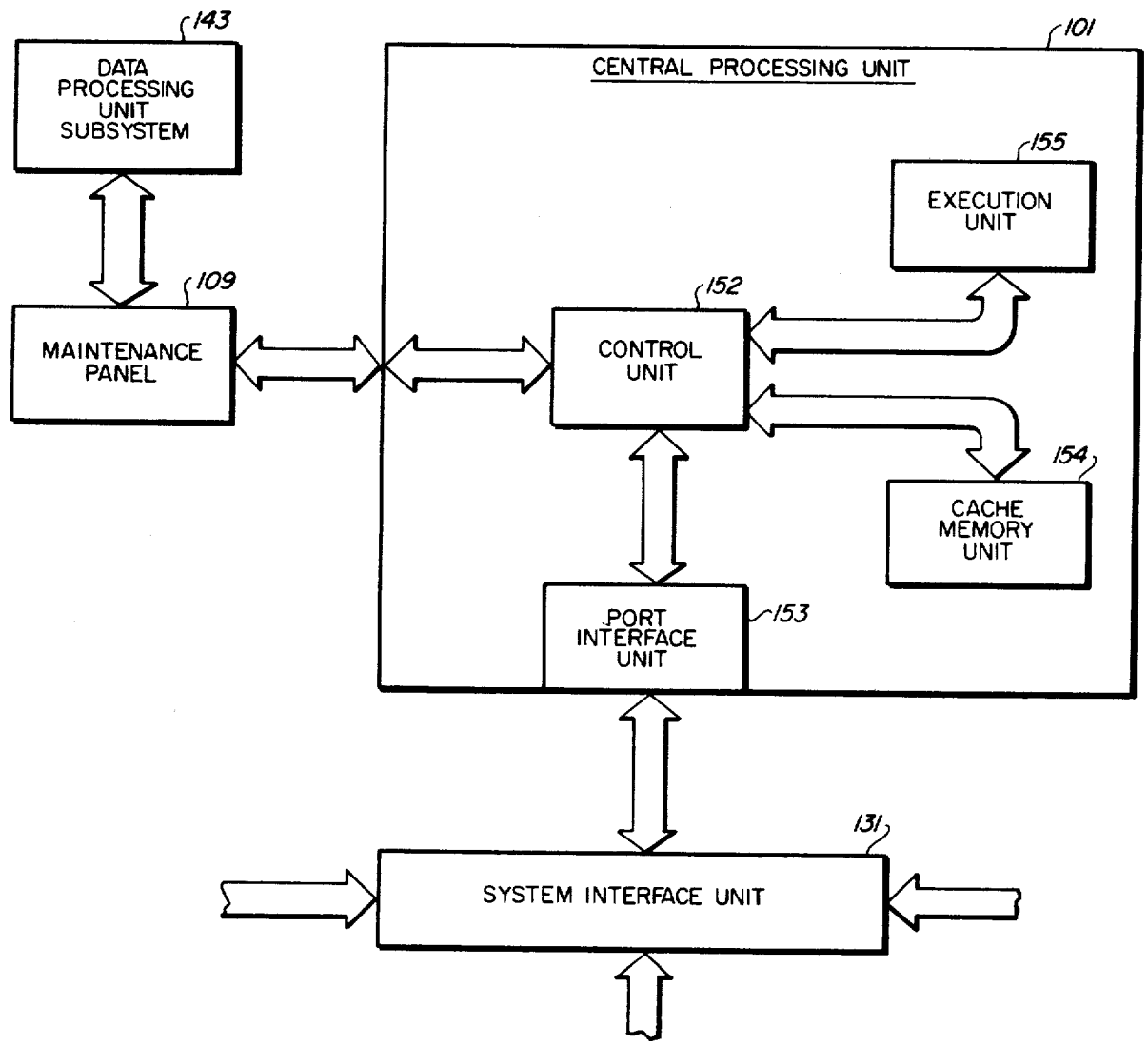
FIG. 2 is a diagram of the central processing unit indicating apparatus associated with data paths in the present invention.

Referring now to FIG. 2, the flow of data signals in the central processing unit and from external apparatus, according to the present invention, is shown. During normal operation, sequences of data are extracted from the memory units by the system interface unit 131 and and applied to the central processing unit 101 under control of the central processing unit. The system interface unit 131 is coupled to the central processing unit through the port interface unit 153. The port interface unit 153 serves, along with other activities, to synchronize the flow of data from the asynchronous system interface unit and associated devices. Data from the system memory is then transferred to the control unit 152 and subsequently transferred to the execution unit 155 for processing. The data can also be transferred to the cache memory unit 154 for temporary storage. The cache memory unit is typically used to store data having a high probability of usage by the central processing unit so that such data will be more readily available for processing. When the data in the cache memory 154 is required for processing, the control unit causes the appropriate data to be moved to the execution unit for processing. Upon completion of the processing, control unit 152 applies the data to the port interface unit 153 which then applies the data to the peripheral subsystem 141, 142 or to the memory unit 121, 122 as required by the operating system or curently active program.

Maintenance panel 109 is associated with the central processing unit 101. The maintenance panel 109 can typically provide data signal and control signal paths to preselected registers and other apparatus in the central processing unit. The maintenance panel 109, according to the instant invention, provides data signal paths from a data processing unit subsystem 143 to the control unit 152. Data processing unit subsystems 143 can be at a remote location if so desired and the maintenance panel can function as a communication interface. The control unit 152 receives the data signals and stores these signals in the cache memory or, depending on the control signals, can apply data signals to the execution unit for processing. While FIG. 2 shows the paths for the movement of data, the maintenance panel 109 has the ability to directly address various key registers in the central processing unit. Its ability to address the registers provides the ability to load these registers and consequently to execute preselected instructions related to the signals loaded in the register. In addition, the maintenance panel can extract data from certain selected registers and locations, and can thus determine the results of the operation on the data processing unit. However, to utilize the maintenance panel in a manner wherein the central processing unit is initialized, an operation is performed and the results of the operation examined in order to locate an error can be time consuming. In addition, this method of testing is artificial and does not exercise the central processing unit in the manner in which programs are typically executed. The more typical operation is provided by loading a series of instructions or programs, executing the instructions or program, and comparing the results of the execution with the results of an error-free operation.

Figure 3:
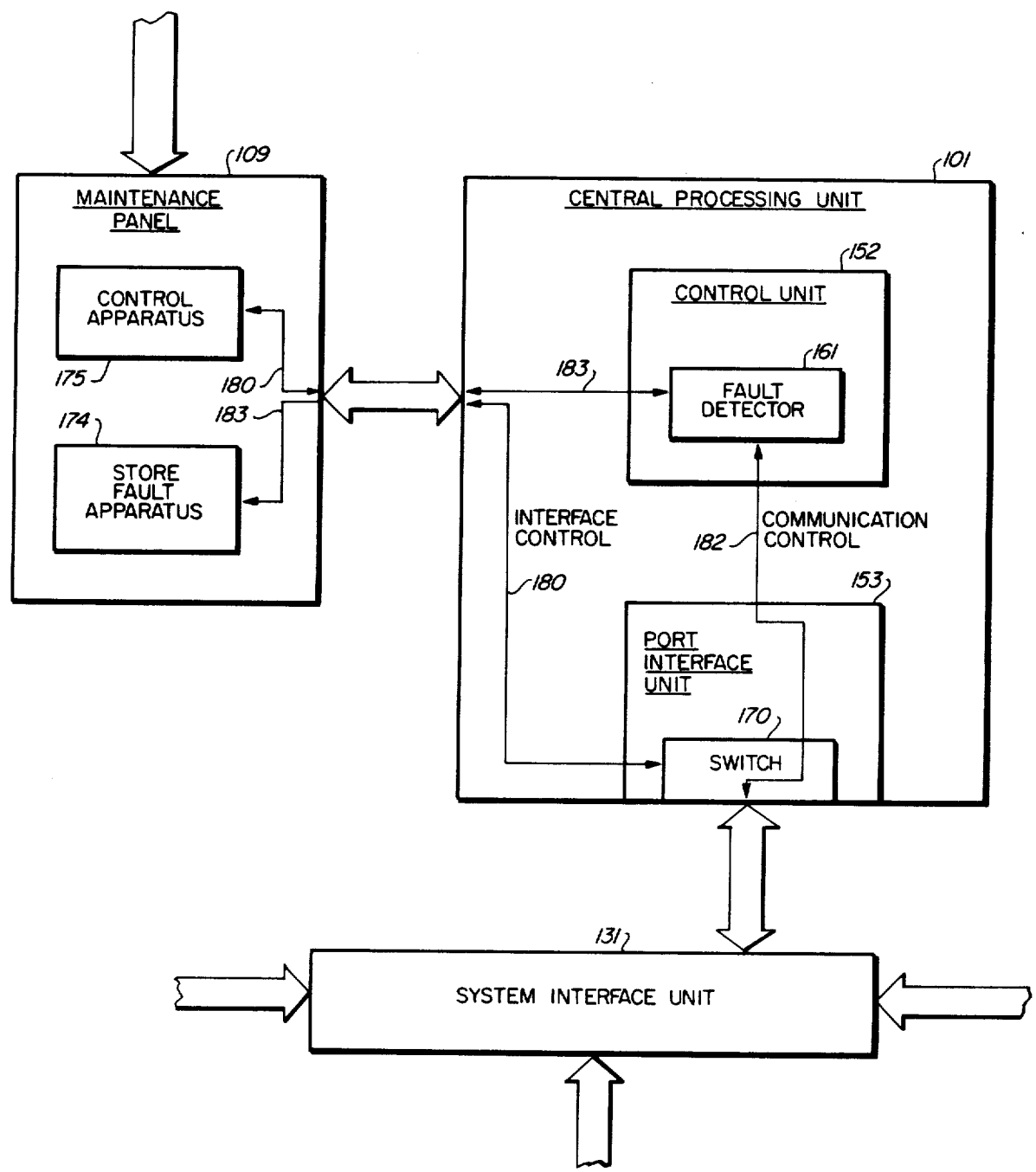
FIG. 3 is a diagram of a central processing unit indicating control signal apparatus and paths associated with the present invention.

Referring next to FIG. 3, the additional control apparatus 175 and control signal paths 180-183 necessary to implement the instant invention are shown. Between the system interface unit 131 and the control unit 152 are control lines which permit the transfer of control signals therebetween. For example, when data is being transferred from the system interface unit 131 to the control unit 152, a "handshaking" operation typically occurs that permits the control unit 152 to know that data is ready to be transferred. When data is not ready to be transferred, or when the system interface unit 131 is not connected to the port interface 153, then fault detector 161, typically a part of the control unit 152, recognizes the configuration and applies, along data path 183, a signal to a store fault apparatus 174 in the maintenance panel 109. As a result of a signal in the store fault apparatus 174, the maintenance panel can execute one of two possible strategies. The maintenance panel, through its control of the registers in the central processing unit 101, can "freeze" the operation of the apparatus and can use the various data paths to explore the state of the registers in an attempt to understand where the fault condition has arisen. Or the maintenance panel, through appropriate manipulation or masking apparatus can, upon detection of a fault in the store fault apparatus, ignore the presence of selected fault signals and continue with the operation of the central processing unit.

FIG. 3 also shows that associated with the port interface unit 153, a switch 170 is included therewith. The switch 170 provides a mechanism of decoupling the central processing unit 101 from the system interface unit 131. The switch 170 can be manually operated or can be operated electrically from appropriate settings on the maintenance panel 109 through interface control line 180.

OPERATION OF THE PREFERRED EMBODIMENT

The operation of the present invention can be understood by consideration of FIG. 2 and FIG. 3. When the central processing unit 101 is determined to have produced an error in operation or when it is desired to routinely test the accuracy of the manipulating apparatus, switch 170 is activated from the maintenance panel or from a manual switch associated therewith, and decouples the central processing unit 101 from the system interface unit 131. The decoupling of the system interface unit has the result that an attempt to load data into the control unit 152, for example by the maintenance panel, will result in determination of the fault detector 161 that the normal computer operation is not occurring i.e., the transferred data signals do not originate from the system interface units. A signal communicating this lack of normal operation is transferred to the maintenance panel and the signal is stored in store fault apparatus 174. Thus any attempt to store programs in the cache memory would typically not be possible, however, the maintenance panel is provided with appropriate apparatus so that the store fault apparatus signal can be ignored or masked and data signals from the maintenance panel can be transferred to the control unit and consequently into the cache memory.

Once a program or sequence of instructions is stored in a cache memory 154, then the maintenance panel can permit the setting of appropriate switches in the control unit and in the execution unit so that the execution unit can branch to the address in cache memory of the first instruction of the test program or sequence. From that initial access of the instruction sequence until the end of the program, the execution unit 155 executes the sequence of instructions in order. At the end of the program the results are stored in the cache memory and can be transferred to the maintenance panel via the various data lines in response to appropriate control signals. If desired, the results from the execution unit can be transferred by the control unit 101 to the maintenance panel 109 during the operation. In either event in the preferred embodiment the results of the test program or sequences are typically transferred to a data processing unit subsystem. While this can be a storage device for storage of programs, in the preferred embodiment data processing unit subsystem 143 is a small data processing unit. This data processing unit can be programmed to compare the results of the program execution with the results of accurate operation and can thus determine if a malfunction is occurring and the origin of the malfunction. The present invention can therefore execute programs within the central processing unit independently of the remainder of the data processing system and still execute the programs or instruction sequence in a manner which is closely associated with program execution.

Thus an efficient method of central processing verification is provided.

The above description is included to illustrate the operation of the preferred embodiment and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. In a data processing system having a plurality of central processing units (CPUs), each CPU being operatively connected to other portions of the data processing system through a system interface unit, the other portions of said data processing system including at least one main memory unit, the CPU including a cache memory for storing information which includes instructions and data, an execution unit for manipulating data in accordance with the instruction currently being executed, and a control unit for controlling sequences of operation of said CPU, and further wherein each CPU includes an apparatus for verifying the operability of said CPU independent from the operation of said data processing system, said apparatus comprising:
   (a) switch means, interposed between a first port of said CPU and said system interface unit, for decoupling said CPU from said system interface unit in response to a decoupling control signal thereby decoupling said CPU from the data processing system;
   (b) detecting means, operatively connected to said switch means, for detecting whether the CPU and the system interface unit are operatively connected to generate a configuration signal indicating the status of the operative connection therebetween; and
   (c) a maintenance panel operatively connected to said switch means and to said detecting means via a second CPU port, said maintenance panel including:
      (i) means for activating said switch means;
      (ii) means for sensing said configuration signal thereby recognizing the decoupling of the CPU from the system interface unit;
      (iii) means for overriding the presence of a fault condition indicated by said configuration signal generated by the decoupling of said system interface unit from said CPU thereby permitting said CPU to continue its normal operation;
      (iv) means for providing sequences of information to said control unit;
      (v) means for controlling said control unit to permit said sequences of information to be stored in said cache memory;
      (vi) means for causing said sequences of information in said cache memory to be executed by said CPU;
      (vii) means for causing results of executing the sequences of information to be transferred to said maintenance panel; and
      (viii) means for comparing said results to expected results to indicate whether the CPU is functioning correctly thereby verifying the operability of the CPU.

2. An apparatus for verifying the operability of said CPU according to claim 1, further comprising:
   a data processing unit subsystem, operatively connected to said maintenance panel, for controlling the verifying of the operability of the CPU, the maintenance panel supplying said sequences of information to said maintenance panel and receiving said results from said maintenance panel.

3. In a data processing system having a plurality of central processing units (CPUs), each CPU being operatively connected to other portions of the data processing system through a system interface unit, the other portions of said data processing system including at least one main memory unit, the CPU including a cache memory for storing information which includes instructions and data, an execution unit for manipulating data in accordance with the instruction currently being executed, and a control unit for controlling sequences of operation of said CPU, an apparatus for verifying the operability of each CPU independent from the operation of said data processing system, said apparatus comprising:
   (a) a plurality of switch means, each switch means being interposed between a first port of a corresponding CPU and said system interface unit, for decoupling the corresponding CPU from said system interface unit in response to a decoupling control signal thereby decoupling the corresponding CPU from the data processing system;
   (b) a plurality of detecting means, each detecting means being operatively connected to a corresponding switch means, for detecting whether the corresponding CPU and the system interface unit are operatively connected to generate a corresponding configuration signal indicating the status of the operative connection therebetween; and
   (c) a maintenance panel switchably connected to a predetermined switch means and to the corresponding predetermined detecting means via a second port of an associated CPU, said maintenance panel including:
      (i) means for activating said predetermined switch means;
      (ii) means for sensing said corresponding configuration signal thereby recognizing the decoupling of the associated CPU from the system interface unit;
      (iii) means for overriding the presence of a fault condition indicated by the corresponding configuration signal generated by the decoupling of said system interface unit from the associated CPU thereby permitting the associated CPU to continue its normal operation;
      (iv) means for providing sequences of information to the associated control unit;
      (v) means for controlling the associated control unit to permit said sequences of information to be stored in the associated cache memory;
      (vi) means for causing said sequences of information in the associated cache memory to be executed by the associated CPU;
      (vii) means for causing results of executing the sequences of information to be transferred to said maintenance panel; and
      (viii) means for comparing said results to expected results to indicate whether the associated CPU is functioning correctly thereby verifying the operability of the associated CPU.

4. An apparatus for verifying the operability of each CPU according to claim 3, further comprising:
   a data processing unit subsystem, operatively connected to said maintenance panel, for controlling the verifying of the operability of the associated CPU, the maintenance panel supplying said sequences of information to said maintenance panel and receiving said results from said maintenance panel.

* * * * *